US012738141B2

(12) United States Patent
Valentine et al.

(10) Patent No.: US 12,738,141 B2
(45) Date of Patent: Sep. 15, 2026

(54) FALL MONITOR SYSTEM

(71) Applicant: DeRoyal Industries, Inc., Powell, TN (US)

(72) Inventors: Ethan E. Valentine, Knoxville, TN (US); Dhanvin S. Desai, Knoxville, TN (US); Sarah O. Davis, Knoxville, TN (US); Daniel W. Marzahl, Jr., Knoxville, TN (US); Karen M. Clements, Knoxville, TN (US); Nick Sinas, Franklin, TN (US)

(73) Assignee: DeRoyal Industries, Inc., Powell, TN (US)

( * ) Notice: Subject to any disclaimer, the term of this patent is extended or adjusted under 35 U.S.C. 154(b) by 0 days.

(21) Appl. No.: 19/216,800

(22) Filed: May 23, 2025

(65) Prior Publication Data

US 2025/0285522 A1 Sep. 11, 2025

Related U.S. Application Data

(63) Continuation-in-part of application No. 18/198,113, filed on May 16, 2023, now Pat. No. 12,340,673.

(Continued)

(51) Int. Cl.

*H04W 12/50* (2021.01)
*G06K 7/10* (2006.01)

(Continued)

(52) U.S. Cl.

CPC ..... *G08B 21/0461* (2013.01); *G06K 7/10366* (2013.01); *G06K 19/0723* (2013.01);

(Continued)

(58) Field of Classification Search

None

See application file for complete search history.

(56) References Cited

U.S. PATENT DOCUMENTS

2007/0040692 A1* 2/2007 Smith .................. A61B 5/1115 340/573.1
2008/0272918 A1 11/2008 Ingersoll (Continued)

OTHER PUBLICATIONS

Patent Cooperation Treaty, International Searching Authority, International Search Report and Written Opinion for International Application PCT/US2025/030705, Dated Jul. 25, 2025.

*Primary Examiner* — John F Mortell
(74) *Attorney, Agent, or Firm* — Luedeka Neely, P.C.

(57) ABSTRACT

A fall monitor display unit including a controller configured to generate a fall alarm signal in response to a fall alarm communication from a fall sensor and a reset button configured to provide instructions to the controller for disabling the fall alarm signal when the reset button is activated and engaged. The display unit further including a tamper proof mode in which the reset button is deactivated such that engagement of the reset button of the fall monitor display unit is prevented from disabling the fall alarm signal. The display unit further including a clinician key section having at least a first wireless communications receiver configured to receive a wireless communication from a clinician key, the wireless communication operable to activate the reset button when the fall monitor display unit is in the tamper proof mode and the clinician key is placed in proximity to the clinician key section.

20 Claims, 3 Drawing Sheets

Related U.S. Application Data

(60) Provisional application No. 63/342,268, filed on May 16, 2022.

(51) Int. Cl.

| | |
|---|---|
| ***G06K 19/07*** | (2006.01) |
| ***G08B 21/04*** | (2006.01) |
| ***G08B 25/00*** | (2006.01) |
| ***G08B 25/10*** | (2006.01) |

(52) U.S. Cl.

CPC ......... *G08B 21/043* (2013.01); *G08B 25/008* (2013.01); *G08B 25/10* (2013.01); *H04W 12/50* (2021.01)

(56) References Cited

U.S. PATENT DOCUMENTS

| | | | | |
|---|---|---|---|---|
| 2014/0275876 | A1* | 9/2014 | Hansen | G16Z 99/00 600/323 |
| 2014/0343967 | A1* | 11/2014 | Baker | G16Z 99/00 705/3 |
| 2016/0292089 | A1* | 10/2016 | Achar | G16H 40/63 |
| 2018/0110477 | A1 | 4/2018 | Collins, Jr. et al. | |
| 2020/0411198 | A1* | 12/2020 | Chung | G16H 40/20 |
| 2022/0054047 | A1 | 2/2022 | Kilcran et al. | |
| 2022/0101712 | A1 | 3/2022 | Carr et al. | |
| 2024/0005760 | A1 | 1/2024 | Prajapati | |

* cited by examiner

FALL MONITOR SYSTEM

CROSS REFERENCE TO RELATED APPLICATIONS

This application claims priority as a continuation-in-part to co-pending U.S. application Ser. No. 18/198,113 filed May 16, 2023, which claimed priority to Provisional Application Ser. No. 63/342,268 filed May 16, 2022, each being entitled "Fall Monitor System" and the entire contents of which are incorporated herein by reference.

FIELD

This disclosure relates to the field of fall monitor systems. More particularly, this disclosure relates to a fall monitor system having an improved monitor display unit with improved functionality.

BACKGROUND

Fall monitor systems generally include a pressure detection pad electrically connected to a fall monitor. Current pressure detection pads generally include five layers: (1) top PVC outer film layer; (2) a first mylar sheet with a conductive ink pattern; (3) a polyurethane foam deflecting barrier; (4) a second mylar sheet with a conductive ink pattern; and (5) a bottom PVC outer film layer. The pad is operable to communicate with the monitor in either a wireless or wired connection as known in the art.

In operation, the pressure detection pad is placed underneath the intended position of a patient (such as a bed or wheel chair). When weight is applied to the pad, a circuit is completed between the conductive ink patterns of the first and second mylar sheets through the polyurethane foam layer. Completion of the circuit generates a signal that is sent to the fall monitor. When the circuit is broken (i.e., a patient has fallen or otherwise shifted weight completely off the pad), an alarm is generated at the fall monitor.

Issues with current fall monitor systems include difficulty and/or complexity in pairing a fall detection pad to a fall monitor for wireless systems. Additionally, many current monitors are limited in that they may only communicate with a fall detection pad in a wired connection or a wireless connection. Another problem with many fall monitors is that the monitors are designed such that a caregiver, patient, or other visitor in a patient room may activate a "hold" or "suspend" mode of the monitor or otherwise disable a fall alarm unintentionally.

What is needed therefore is an improved fall monitor system that addresses the above and other problems with existing designs.

SUMMARY

The above and other needs are met by a fall monitor system including a fall monitor display unit and a fall detection pad. The fall monitor display unit including a controller configured to generate a fall alarm signal in response to a fall alarm communication, a reset button configured to provide instructions to the controller for disabling the fall alarm signal when the reset button is engaged, a standard operating mode in which engagement of the reset button is operable to disable the fall alarm signal for at least a predetermined period of time, a tamper proof mode in which the reset button of the fall monitor display unit is deactivated such that engagement of the reset button is prevented from disabling the fall alarm signal, and a clinician key section having a first wireless communications receiver, the first wireless communications receiver being configured to receive wireless communications from a corresponding clinician key for providing instructions to the controller to activate the reset button during the tamper proof mode when the clinician key is placed in proximity to the clinician key section. The fall detection pad is configured to transmit the fall alarm communication to the fall monitor display unit when the fall detection pad determines that a patient has removed pressure from the fall detection pad. The fall detection pad includes a wireless communications module having a first pad transmitter configured to communicate with the first wireless communications receiver to transmit a pairing communication when the first pad transmitter of the fall detection pad is placed in proximity to the clinician key section to pair the fall detection pad to the fall monitor display unit.

According to certain embodiments, the reset button is activated for a predetermined period of time upon the clinician key being placed in proximity to the clinician key section during the tamper proof mode.

According to certain embodiments, the reset button is operable to disable the fall alarm signal when the fall monitor display unit is in the standard operating mode without the clinician key first being placed in proximity to the clinician key section.

According to certain embodiments, the first wireless communications receiver includes an RFID reader and the corresponding clinician key includes an RFID tag such that, when the clinician key is placed in proximity of the clinician key section, the RFID tag is operable to transmit an identifier to the RFID reader to provide the instructions to the controller to activate the reset button during the tamper proof mode. In some embodiments, the RFID tag is a passive RFID tag.

According to certain embodiments, the fall monitor display unit further includes a second wireless communications receiver in communication with the controller and configured to receive wireless communications according to a different communications protocol than the first wireless communications receiver. The wireless communications module of the fall detection pad further includes a second pad transmitter configured to communicate with the second wireless communications receiver of the fall monitor display unit when the fall detection pad is paired with the fall monitor display unit to transmit the fall alarm communication when the fall detection pad determines that a patient has removed pressure from the fall detection pad.

In some embodiments, the first wireless communications receiver of the fall monitor display unit includes an RFID reader and the corresponding clinician key includes a first RFID tag such that, when the clinician key is placed in proximity of the clinician key section, the RFID tag is operable to transmit an identifier to the RFID reader to provide the instructions to the controller to activate the reset button during the tamper proof mode. The first pad transmitter of the fall detection pad then includes a second RFID tag that is operable to transmit a pad identifier for transmitting the pairing communication to the RFID reader of the fall monitor display unit. The second wireless communications receiver of the fall monitor display unit includes a Bluetooth receiver, and the second pad transmitter of the fall detection pad includes a Bluetooth transmitter for communicating with the Bluetooth receiver of the fall monitor display unit when the fall detection pad is paired with the fall monitor display unit to transmit the fall alarm communication when the fall detection pad determines that a patient has removed pressure from the fall detection pad.

According to certain embodiments, the tamper proof mode further includes disabling an adjustment of at least one of a volume of the alarm signal and a melody of the alarm signal.

According to another embodiment of the disclosure, a fall monitor display unit includes a controller configured to generate a fall alarm signal in response to a fall alarm communication from a fall sensor, a reset button configured to provide instructions to the controller for disabling the fall alarm signal when the reset button is activated and engaged, a tamper proof mode in which the reset button is deactivated such that engagement of the reset button of the fall monitor display unit is prevented from disabling the fall alarm signal, and a clinician key section having at least a first wireless communications receiver configured to receive a wireless communication from a clinician key. According to this embodiment, the wireless communication is operable to activate the reset button when the fall monitor display unit is in the tamper proof mode and the clinician key is placed in proximity to the clinician key section.

According to certain embodiments, the first wireless communications receiver is an RFID reader configured to receive an identifier from an RFID tag of the clinician key activating the reset button when the fall monitor display unit is in the tamper proof mode.

According to certain embodiments, the fall monitor display unit further includes a second wireless communications receiver configured to receive the fall alarm communication from a transmitter of the fall sensor after the fall sensor is paired to the fall monitor display unit. In some embodiments, the first wireless communications receiver of the fall monitor display unit includes an RFID receiver and the second wireless communications receiver of the fall monitor display unit includes a Bluetooth receiver. According to some embodiments, the second wireless communications receiver is configured to receive wireless communications according to a longer range communications protocol than the first wireless communications receiver.

According to certain embodiments, the first wireless communications receiver includes a low power state for conserving power while detecting for the presence of the clinician key being placed in proximity to the clinician key section and an increased power state for communicating with the clinician key when the presence of the clinician key is detected.

According to certain embodiments, the wireless communication received from the clinician key is operable to activate the reset button for a predetermined period of time.

According to certain embodiments, the instructions to the controller for disabling the fall alarm signal includes silencing the fall alarm signal when the fall monitor display unit is in an alarm state and suspending the fall alarm signal when the fall monitor display unit is in a monitoring state.

According to certain embodiments, the fall monitor display unit further includes a standard operating mode wherein the reset button remains activated such the fall alarm signal is operable to be disabled when the reset button is engaged without first requiring the first wireless communications receiver to receive the wireless communication from the clinician key.

According to another embodiment of the disclosure, a method for monitoring a patient for a fall includes providing a fall monitor display unit configured to generate a fall alarm signal in response to a fall alarm communication. The fall monitor display unit includes a reset button configured to provide instructions to the controller for disabling the fall alarm signal when the reset button is activated and engaged, a tamper proof mode in which the reset button is deactivated such that engagement of the reset button of the fall monitor display unit is prevented from disabling the fall alarm signal, and a clinician key section having at least a first wireless communications receiver configured to receive a wireless communication from a clinician key. The method further includes providing a fall sensor configured to generate the fall alarm communication; generating the fall alarm communication when the fall sensor detects a patient fall; transmitting the fall alarm communication from the fall sensor to the fall monitor display unit; generating the fall alarm signal at the fall monitor display unit upon receipt of the fall alarm communication from the fall sensor; activating the reset button when the monitor display unit is in the tamper proof mode upon receipt of the wireless communication by the first wireless communications receiver while the clinician key is placed in proximity to the clinician key section; and disabling the fall alarm signal upon engagement of the reset button while the reset button is activated when the fall monitor display unit is in the tamper proof mode.

According to certain embodiments, the fall sensor includes a sensor transmitter configured to transmit a pairing communication to the first wireless communications receiver of the clinician key section, and the method further includes pairing the fall sensor to the fall monitor display unit upon receipt of the pairing communication from the sensor transmitter when the fall sensor is placed in proximity to the clinician key section.

According to certain embodiments, the fall monitor display unit further includes a standard operating mode wherein the reset button remains activated, and the method further includes disabling the fall alarm signal when the fall monitor display unit is in the standard operating mode upon engagement of the reset button without first requiring the first wireless communications receiver to receive the wireless communication from the clinician key.

BRIEF DESCRIPTION OF THE DRAWINGS

Other embodiments of the disclosure will become apparent by reference to the detailed description in conjunction with the figures, wherein elements may not be to scale so as to more clearly show the details, wherein like reference numbers indicate like elements throughout the several views, and wherein.

DETAILED DESCRIPTION

Figure 1:
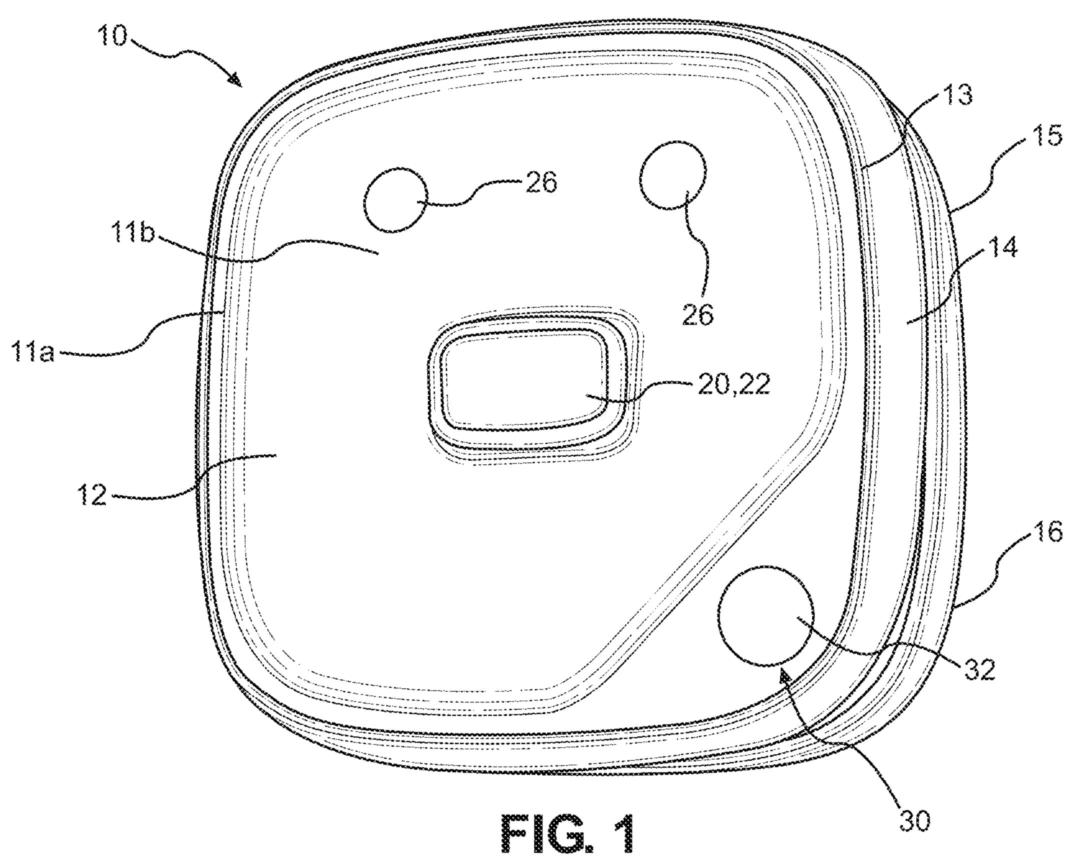
FIG. 1 depicts a front perspective view of a fall monitor according to one embodiment of the disclosure.

Referring to FIG. 1, a fall monitor display unit 10 according to one embodiment of the disclosure is depicted. The fall monitor 10 includes a front surface 12, a rear surface 16, and an outer sidewall 14 connecting the front surface 12 at a front end 13 to the rear surface 16 at a rear end 15. As depicted, the front surface 12 includes an interior sidewall 11*a* leading to a planar wall 11*b* such that the planar wall 11*b* is recessed with respect to the front end 13 of sidewall 14. One or more buttons 20 are disposed on the planar wall 11*b* of front surface 12. The one or more buttons 20, such as a reset button, include a front activation surface 22 having an unactivated position in which the surface 22 is positioned a distance from the planar wall 11*b* of the front surface 12 that is substantially the same or less than a distance in which the front end 13 of sidewall 14 extends from the planar wall 11*b*. As a result, if the monitor 10 is dropped face down, the front end 13 of sidewall 14 will prevent the one or more buttons 20 from being pressed/activated unintentionally.

With continued reference to FIG. 1, the planar wall 11*b* of front surface 12 of the fall monitor 10 further includes one or more lights 26 (e.g., LED lights). The monitor 10 is configured to flash/activate the lights 26 in various colors depending on the operating state of the fall monitor system, the patient status, and/or to issue alarms based on changes in the patient status or changes in the operating state of the fall monitor system. The planar wall 11*b* of front surface 12 being disposed inward with respect to the front end 13 of sidewall 14 as explained above provides a surface (i.e., interior sidewall 11*a* of front surface 12) for the LED light to reflect to make the light appear larger and/or more noticeable.

It should be understood that many other configurations and appearances of the fall monitor display unit 10 are possible and within the scope of the disclosure. For example, the interior sidewall 11*a* could be curved as shown or replaced with a portion that extends inward in a straight fashion (or the degree of curve could be altered), the sidewall 14 could be circular instead of square with rounded corners, the size and shape of the planar wall 11*b* could be altered, etc.

Figure 2:
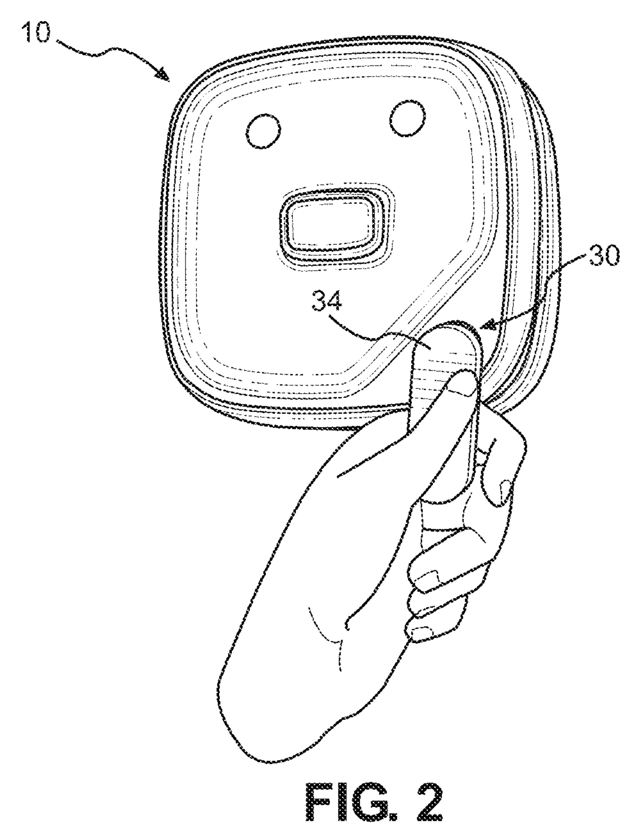
FIG. 2 depicts the front perspective view of the fall monitor of FIG. 1 with a clinician key being placed in proximity to a clinician key section of the fall monitor according to one embodiment of the disclosure.

With reference to FIG. 2, and according to another aspect of the disclosure, the fall monitor display unit 10 further includes a clinician key section 30 having an activation surface 32. The activation surface 32 is preferably a "raised" corner portion that is generally aligned with the front end 13 of the sidewall 14 (i.e., raised with respect to planar wall 11*b*). However, the activation surface 32 could also be disposed on the planar wall 11*b* or even incorporated into the sidewall 14. The clinician key section 30 incorporates a first wireless communications receiver preferably utilizing a short-range, low power wireless communication protocol such as RFID (including NFC), Bluetooth, Wi-Fi, Zigbee, etc. The first receiver is operable to communicate with a wireless transmitter incorporated into a corresponding key 34.

In operation, the clinician key section 30 is operable to activate a particular function of the monitor display 10 when a clinician places the corresponding key 34 in proximity to the activation surface 32. While the particular functions may vary, the clinician key section 30 in certain embodiments is configured to disable a fall alarm signal or otherwise activate a hold/suspend status for the fall alarm signal generated by the monitor when a clinician places a corresponding key 34 in proximity to the activation surface 32 as further described below. In other embodiments, and as also further described below, the clinician key section 30 may be operable to activate one or more buttons 20 of the monitor 10 (e.g., reset button) when the monitor 10 is in a tamper proof mode such that the button(s) 20 may then be used to disable the fall alarm signal or activate the hold/suspend status of the fall alarm signal only after the key 34 is placed in proximity to the activation surface.

For purposes of the present disclosure, "reset button" broadly refers to any type of button, switch, interface, etc. that is able to be pushed, touched, manipulated, or otherwise engaged by a user in order to change the settings or status with respect to the alarm signal of the monitor 10. The potential change in settings or status of the alarm signal include, but are not limited to, a hold status, a suspend status (typically longer than a "hold"), and/or silencing an active alarm signal.

For purposes of the present disclosure, "disabling" a fall alarm signal broadly refers to the act of changing the settings or status of the alarm signal such that the alarm signal is unable to be issued by the monitor at least temporarily. The act of disabling a fall alarm signal includes, but is not limited to, activating a hold status for the alarm signal, activating a suspend status for the alarm signal, and/or silencing an active alarm signal.

Figure 5:
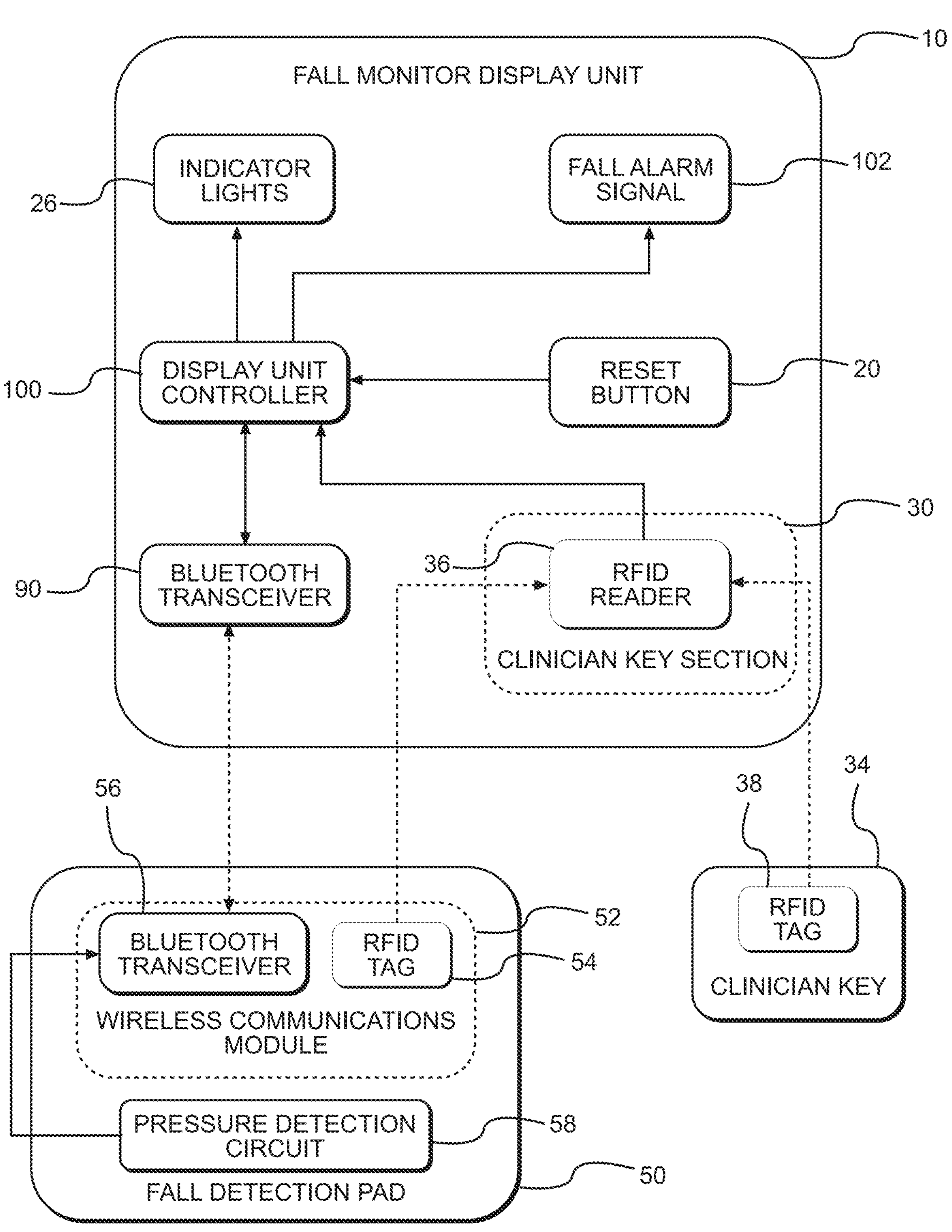
FIG. 5 depicts a block circuit diagram of a fall monitor system according to one embodiment of the disclosure.

With reference to the simplified block circuit diagram of FIG. 5 (referred to as "simplified" as certain understood components of the wireless communication systems referenced have been omitted for simplicity), the receiver 36 of the clinician key section 30 is preferably an RFID reader and the transmitter 38 of the key 34 is a corresponding RFID tag. In most preferred embodiments, the clinician key section 30 and clinician key 34 communicate using a NFC communications standard such that the devices are only able to exchange communications when in close proximity to each other (e.g., a few centimeters). In certain embodiments, the key 34 includes a passive RFID tag that is activated by the RFID reader when placed in proximity to the clinician key section 30. Whether passive or active, when placed in proximity of the clinician key section 30, the key 34 is operable to transmit an identifier to the RFID reader 36 that ultimately provides instruction to the controller 100 of the monitor display unit 10 to activate the intended function assigned to the key 34. For example, in embodiments in which the key 34 is operable to disable or otherwise suspend the fall alarm signal 102 according to certain predetermined parameters, the monitor 10 may be instructed to disable the fall alarm signal 102 for a predetermined period of time to give a caregiver sufficient time to move or otherwise provide certain care to the patient without activation of the alarm signal 102. In other embodiments, the parameters may be defined by the controller 100 such that the fall alarm signal 102 is disabled until the pressure detection pad 50 detects pressure being reapplied to the pad (i.e., the fall alarm signal 102 is disabled upon the key 34 being placed in proximity to the clinician key section 30 and then monitoring is reactivated once the controller 100 determines first that the patient is removed from the pad 50 and then second that the patient has returned to the patient's position on the pad 50).

In certain embodiments, the monitor 10 includes a standard operating mode and a tamper proof mode. The caregiver, hospital, or administrative staff will typically select the desired mode in the settings of the device according to their own protocols or preferences. For example, upon powering up the monitor 10, the monitor enters a standby state. While in the standby state, the settings of the device may be adjusted according to protocols and preferences of the caregiver. Settings include selection of the desired mode (e.g., standard operating mode vs. tamper proof mode) and alarm related settings such as volume and melody of the alarm. In certain embodiments, the monitor includes buttons on the back of the monitor 10 that are operable to adjust the settings. The settings are typically rarely changed once the monitor 10 is installed in a particular room.

After the settings of the monitor 10 have been adjusted as desired, a pad 50 is connected/paired to the monitor either via a corded connection or a wireless connection as described herein. When the monitor 10 is in the standard operating mode, the reset button 20 remains activated with certain functions of the monitor 10 being able to be controlled upon engagement of the button 20 by the caregiver. The available functions being controlled by the reset button 20 during the standard operating mode are typically dependent on the state of the monitor 10 at the time of engagement of the button 20 (e.g., standby state vs. monitoring state vs. alarm state) and/or the type of engagement of the button 20 (e.g., single press vs. holding the button 20 for a particular duration of time). For example, in certain embodiments, pressing the reset button 20 during the standard operating mode while the monitor 10 is in a monitoring state is operable to activate a hold or suspend status for the alarm signal depending on how long the reset button 20 is pressed. On the other hand, when the monitor 10 is in the alarm state during the standard operating mode, the reset button 20 may be pressed to disable the fall alarm signal. In certain further embodiments, the clinician key 34 may be required to activate certain functions of the reset button 20 even when the monitor is in the standard operating mode. For example, if the monitor 10 is in a monitoring state, the reset button 20 may be used to enter a hold or suspend status for a certain amount of time. However, when the monitor 10 is in the alarm state, the monitor 10 could be configured such that the key 34 is still required to disable the fall alarm.

On the other hand, when the monitor is in the tamper proof mode, certain functions of the monitor 10 are not available until the clinician key section 30 is scanned by the key 34 (e.g., the reset button 20 is deactivated or otherwise impaired during the tamper proof mode). For example, the monitor may be placed into tamper proof mode at start-up of the monitor 10 based on the settings of the monitor as described above. The tamper proof mode deactivates the reset button 20 to prevent patients, family members, etc. from interfering with the function of the monitor 10 by requiring the key 34 in order for a user to interface with monitor functions such as disabling the fall alarm signal 102 or entering a hold/suspend status for the monitor 10. Similarly, other buttons 20 (including buttons on the rear of the monitor), switches, functions, etc. of the monitor 10 may also be deactivated while the monitor 10 is in the tamper proof mode. Once the key 34 is placed in proximity of the clinician key section 32, the caregiver is able to activate the previously disabled functions of the monitor. In certain embodiments, the key 34 being placed in proximity of the clinician key section 32 activates the reset button 20 (or otherwise enables certain previously disabled functions of the monitor) for a predetermined amount of time (e.g., ten seconds). Once the predetermined amount of time has elapsed, the monitor 10 automatically returns the reset button 20 to a deactivated/impaired status. Automatically returning the reset button 20 to the deactivated status ensures that a caregiver does not forget to return the monitor to the tamper proof mode after scanning the clinician key section 32 with the key 34.

The tamper proof mode is designed to prevent a patient, or the family members and guests of the patient, from interfering with the function of the monitor 10. In this regard, a common issue with fall monitors is when a family member will attempt to help a patient out of a bed or chair. The family member disables the alarm while assisting the patient. The result is that a caregiver is entirely unaware that a fall risk patient is ambulating with only the help of a family member who may very well have difficulty preventing a patient from falling. Another common issue is a family member or guest of a patient will attempt to change the settings of the monitor (e.g., melody or volume). Given that these settings are commonly standardized across an entire floor/unit of a healthcare facility, a different alarm melody the caregiver is not accustomed to may not be recognized as a fall alarm by the appropriate caregivers. Similarly, if the volume is turned down, the fall alarm may not be audible to a caregiver stationed an appropriate distance from the room under normal volumes of the monitor. A tamper proof mode such as described herein provides a monitoring system with both the desired functionalities of traditional fall monitors while also preventing these types of unintended interferences of the monitor 10 from occurring.

In certain embodiments, the functionality of the monitor 10 is the same in both the standard operating mode and the tamper proof mode, with the only difference being an extra step of first scanning the clinician key section 32 with the key 34 to enable certain functions of the monitor 10 when the monitor is in the tamper proof mode. Thus, usability of the monitor 10 is streamlined even with both a standard operating mode and a new tamper proof mode.

In certain embodiments, the monitor 10 may be selectively responsive to certain tags/identifiers 38 of key 34. In other words, the controller 100 of monitor 10 may be configured to disable the fall alarm signal 102 of fall monitor 10, or activate the reset button 20 when the monitor is in the tamper proof mode, in response to only certain keys 34 having particular identifiers. For example, a specialized RFID tag 38 may be incorporated into a clinician's hospital badge that is configured to transmit a particular identifier to the RFID reader 36 for disabling the fall alarm signal 102 or otherwise activating a particular function of the monitor 10 based on the identifier of the specialized RFID tag. In alternate embodiments, the controller 100 of monitor 10 is configured to disable the fall alarm signal 102 in response to any key 34 with a RFID tag 38 being placed in proximity to the clinician key section 30. For example, the controller 100 may be configured to disable the fall alarm signal 102 in response to any existing RFID tag 38 that is incorporated into a clinician's hospital badge.

In preferred embodiments, the first wireless communications receiver of the clinician key section 30 is selected to include both a low power state and an increased power state in order to conserve power during normal monitoring status. For example, in preferred embodiments in which the receiver is an RFID reader 36, the RFID reader 36 includes a low power state in which the amount of RF energy emitted from the RFID reader 36 is decreased but is still otherwise capable of detecting changes to the RF field adjacent the activation surface 32 of the clinician key section 30 (i.e., a scanning mode). The lower power state would typically be the default status when the monitor 10 is powered on and the fall alarm monitoring is activated. Once a change in the RF field is determined by the RF reader 36 in its low power state, the RFID reader 36 "wakes up" to switch to its increased power state for reading the RFID tag 38 of key 34 (or the RFID tag 54 of the wireless communications module 52 described below). Similarly, in embodiments in which the clinician key section 30 operates using Bluetooth technology, the receiver may operate in a lower/sleep power state (e.g., Bluetooth low energy) until a key 34 is detected such that the receiver "wakes up" to an increased power state sufficient to transfer the necessary data from the transmitter of the key 34 to the receiver of the clinician key section 30.

In alternate embodiments, the clinician key section 30 may also include a power switch that is biased to the off position to conserve power to the receiver of the clinician key section 30. The key 34 then includes a corresponding mechanism that is configured to wirelessly activate the power switch to the receiver. For example, an RFID reader may be powered by a magnetic relay switch. The key 34 then includes a corresponding magnet to activate the RFID reader upon placing the key 34 in proximity to the clinician key section 30, which then allows the RFID reader to read the identifier of the RFID tag of the key 34. In other embodiments, the receiver of the clinician key section 30 could be configured to be passive or otherwise in a sleep mode until activated by the key 34. According to this embodiment, the key 34 is operable to transfer power to the receiver of the clinician key section 30 when the key 34 is placed in proximity to the activation surface 32.

Figures 3, 4:
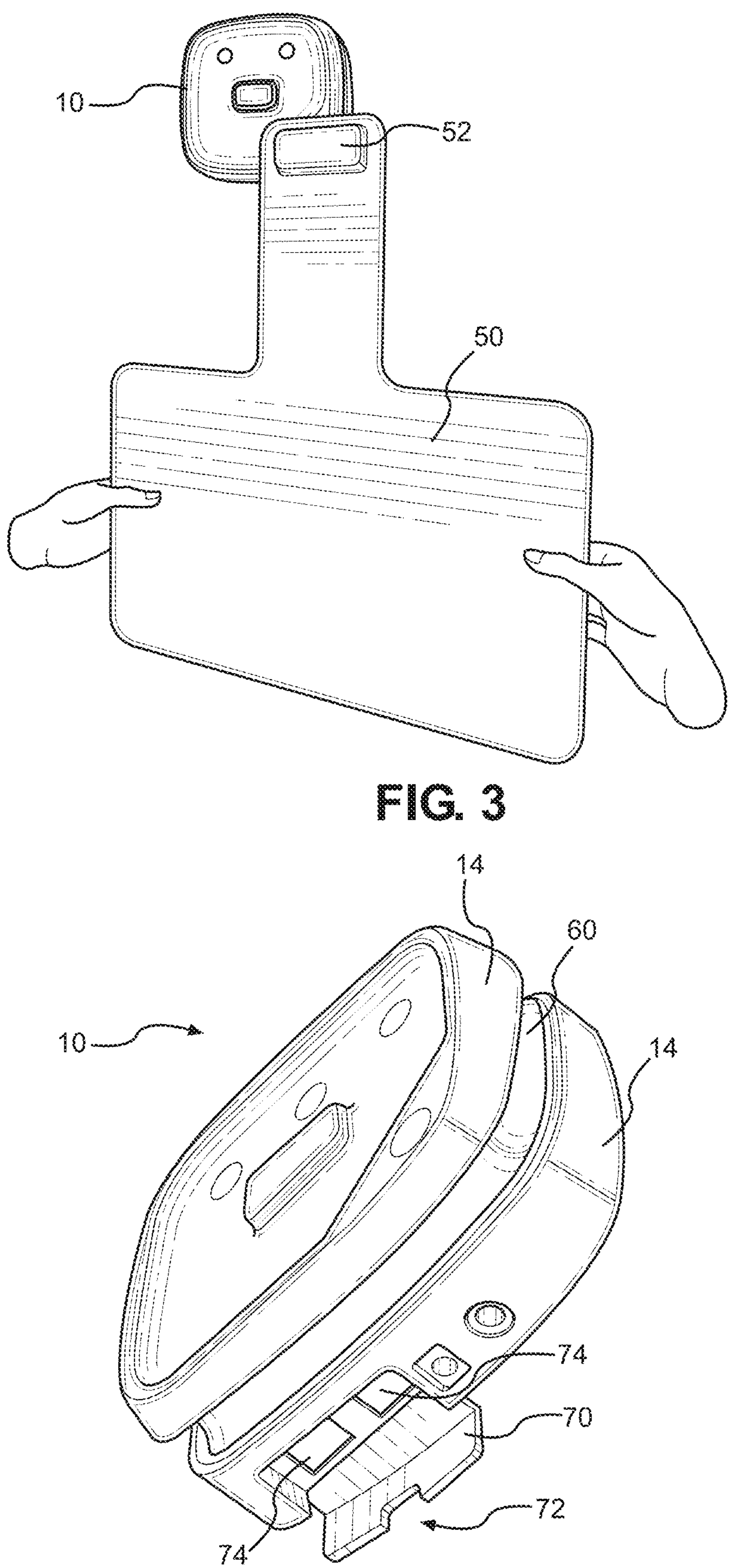
FIG. 3 depicts a front perspective view of the fall monitor of FIG. 1 with a wireless module of a fall detection pad being placed in proximity to a clinician key section of the fall monitor to pair the pad to the fall monitor according to one embodiment of the disclosure.
FIG. 4 depicts a bottom perspective view of the fall monitor of FIG. 1 according to one embodiment of the disclosure.

With reference to FIG. 3, the first wireless communications receiver 36 of the clinician key section 30 may also double as a receiver for initiating a pairing process between a wireless pad 50 and monitor 10. According to this embodiment, the wireless pad 50 includes a wireless communications module 52 for communicating wirelessly with the monitor 10. Once paired, the pad 50 and monitor 10 may be configured to communicate wirelessly according to any number of wireless communications systems including Bluetooth, Wi-Fi, Zigbee, NFC, etc. To unpair a particular pad module 52 from the monitor 10, the monitor may include an "unpair" button (such as in the rear of the device that is covered by a rear access door that may include a place for batteries, settings for the monitor to be changed, etc.). The unpair button is preferably disabled during the tamper proof mode.

More specifically, and with reference to the preferred embodiment of FIG. 5, the wireless communications module 52 of the pad 50 includes a first pad transmitter 54 and a second pad transmitter 56 while the monitor display unit 10 further includes a second wireless communications receiver 90. According to the embodiment shown in FIG. 5, the first pad transmitter 54 is preferably an RFID tag operable to transmit a pairing communication to the RFID reader 36 when the fall detection pad 10 and/or wireless communications module 52 is placed in proximity to the clinician key section 30 to initiate a pairing process between the pad 50 and the monitor 10. The second pad transmitter 56 and second wireless communications receiver 90 then operate under a different communications protocol (e.g., longer range Bluetooth standard) than the RFID tag 54 and RFID reader 36. In preferred embodiments, and as shown in FIG. 5, the second pad transmitter 56 includes a Bluetooth transmitter (that is preferably incorporated into a Bluetooth transceiver for bidirectional communication between the monitor 10 and pad 50) while the second wireless communications receiver 90 includes a Bluetooth receiver (and preferably incorporated into a corresponding Bluetooth transceiver). Once paired, the Bluetooth transceiver 56 of the pad 50 is operable to communicate with the Bluetooth transceiver 90 of the monitor 10 during standard operation of the fall monitor system. Standard operation of the system includes a monitoring mode in which a pressure detection circuit 58 of the pad 50 monitors for a patient removing pressure from the pad 50. When the circuit 58 is broken (i.e., the patient has removed pressure for the pad 50), the fall detection pad 50 generates a fall alarm communication that is transmitted by the Bluetooth transceiver 56 of the pad 50 to the Bluetooth transceiver 90 of the monitor 10 such that the controller 100 issues the fall alarm signal 102 (assuming the hold function has not been activated by the clinician key 34).

According to another aspect of the disclosure, a method of pairing a pad 50 to a monitor 10 and then using the monitor to detect patient movement at the pad is provided according to the following steps: (1) the wireless module 52 is connected to pad 50; (2) the pad 50 is paired to the monitor 10 by positioning wireless module 52 of pad 50 in proximity to the clinician key section 30 of the monitor 10; (3) a light 26 of the monitor 10 blinks a particular color (e.g., blue) to indicate a standby state; (4) the pad 50 is positioned as desired for the patient; (5) the patient provides weight on the pad 50 (sits or lays down on the pad) to change the pad status from the standby state to an armed state, and the blinking light 26 of the monitor 10 changes colors (e.g., green) to indicate the armed state; (6) if the patient removes their weight from the pad 50, the fall alarm signal 102 is issued by the monitor 10 and the blinking light 26 changes colors (e.g., red) to indicate an alarm state for the monitor 10; and (7) to stop the alarm and go back to the standby state, a caregiver presses the "reset" button 20 on the monitor 10. As described herein, when the monitor is in a tamper proof mode, the clinician key 34 must first be placed in proximinty to the clinician key section 30 prior to pressing the reset button 20 in order to return the monitor to the standby state after the fall alarm signal 102 is issued.

According to certain embodiments, the same monitor 10 is preferably able to be used with a pad 50 using both a wireless connection and a wired connection. When the pad 50 is connected to the monitor 10 using a wired connection, the above method remains generally the same except a cable is connected to the pad 50 and monitor 10 instead of having to pair the wireless module 52 to the monitor 10.

With reference to FIG. 4, monitor 10 may also include a corded retention system 60 for when a wired connection is at least desired as an option to connect the monitor 10 to a pad. As shown, the corded retention system may be in the form of a recess positioned in the sidewall 14 around the periphery of the monitor 10. The cord is then wrapped around the recess to retain the cord to the monitor 10. In another embodiment, the corded retention system could include a set of spaced apart hooks positioned on the monitor 10 (e.g., along a surface of the sidewall 14) for wrapping the cord around the hooks. In yet another embodiment, the monitor could include a cavity such that the cord can be placed in the cavity when not in use. In yet another embodiment, one end of the cord is retained within a cavity and the cord is then able to be expanded or retracted as needed from within the cavity. It should also be understood that the corded retention systems as described above could be used to both retain the cord when not in use or retract/expand the cord when in use depending on the desired length of the cord.

According to another aspect of the disclosure, wired embodiments of the present fall monitor system preferably include a reusable cable for connecting the pad to the monitor 10. In certain embodiments, the reusable cable is permanently connected to the monitor 10 at a first end and then able to be removably connected to the pad at the opposite second end. In other embodiments, the reusable cable is removably connected to both the monitor 10 at its first end using various hard-wired connection systems such as a USB or USB-C connection and the pad at its second end.

In preferred embodiments in which the reusable cable is removably connected to monitor 10, the monitor 10 includes a tamper resistant mechanism for preventing unintentional disconnections between the cable and the monitor 10. For example, the cable could include both a plug interface to make the electrical connection between the cable and the monitor 10 and then an additional screw interface for preventing unintentional disconnections between the cable and the monitor 10. According to another embodiment, and with reference again to FIG. 4, the tamper resistant mechanism is in the form of the monitor 10 including an access door 70 that is movable from an open position (shown in FIG. 4) to a closed position. The access door 70 further includes a gap portion 72. In the open position, one or more cable connection ports 74 are accessible such that the first end of the cable is able to be connected to one of the ports 74 when the access door 70 is open. The access door 70 may then be shut with the cable extending through the gap portion 72 of the access door 70. The first end of the cable (e.g., USB overmold) would then be dimensioned and configured such that it would not fit through the gap portion 72 of the access door when the access door 70 is in the closed position (i.e., the cable is unable to be disconnected from port 74 when the access door 70 is in the closed position).

While the fall monitor display unit 10 described herein is believe to be particularly suited to be paired with a fall detection pad (i.e., a pad in which a fall alarm communication is communicated to the monitor upon detection of pressure being removed from the pad), it should be understood that other types of fall sensors, movement sensors, or other types of sensors in which a patient action is being monitored may be utilized with the monitor 10. For example, a a motion type fall sensor that is attached to or otherwise worn by a patient that detects movements/falls of the patient (e.g., inertial measurement unit) may be similarly paired to the monitor 10.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by any claims when interpreted in accordance with the breadth to which they are fairly, legally, and equitably entitled.

What is claimed is:

1. A fall monitor system comprising:

a fall monitor display unit including:

a controller configured to generate a fall alarm signal in response to a fall alarm communication, a reset button configured to provide instructions to the controller for disabling the fall alarm signal when the reset button is engaged, a standard operating mode in which engagement of the reset button is operable to disable the fall alarm signal for at least a predetermined period of time, a tamper proof mode in which the reset button of the fall monitor display unit is deactivated such that engagement of the reset button is prevented from disabling the fall alarm signal, and a clinician key section having a first wireless communications receiver, the first wireless communications receiver being configured to receive wireless communications from a corresponding clinician key for providing instructions to the controller to activate the reset button during the tamper proof mode when the clinician key is placed in proximity to the clinician key section; and a fall detection pad configured to transmit the fall alarm communication to the fall monitor display unit when the fall detection pad determines that a patient has removed pressure from the fall detection pad, the fall detection pad having a wireless communications module, the wireless communications module including a first pad transmitter configured to communicate with the first wireless communications receiver to transmit a pairing communication when the first pad transmitter of the fall detection pad is placed in proximity to the clinician key section to pair the fall detection pad to the fall monitor display unit.

2. The fall monitor system of claim 1 wherein the reset button is activated for a predetermined period of time upon the clinician key being placed in proximity to the clinician key section during the tamper proof mode.

3. The fall monitor system of claim 1 wherein the reset button is operable to disable the fall alarm signal when the fall monitor display unit is in the standard operating mode without the clinician key first being placed in proximity to the clinician key section.

4. The fall monitor system of claim 1 wherein the first wireless communications receiver includes an RFID reader and the corresponding clinician key includes an RFID tag such that, when the clinician key is placed in proximity of the clinician key section, the RFID tag is operable to transmit an identifier to the RFID reader to provide the instructions to the controller to activate the reset button during the tamper proof mode.

5. The fall monitor system of claim 4 wherein the RFID tag is a passive RFID tag.

6. The fall monitor system of claim 1 wherein:

the fall monitor display unit further includes a second wireless communications receiver in communication with the controller and configured to receive wireless communications according to a different communications protocol than the first wireless communications receiver, and the wireless communications module of the fall detection pad further includes a second pad transmitter configured to communicate with the second wireless communications receiver of the fall monitor display unit when the fall detection pad is paired with the fall monitor display unit to transmit the fall alarm communication when the fall detection pad determines that a patient has removed pressure from the fall detection pad.

7. The fall monitor system of claim 6 wherein:

the first wireless communications receiver of the fall monitor display unit includes an RFID reader and the corresponding clinician key includes a first RFID tag such that, when the clinician key is placed in proximity of the clinician key section, the RFID tag is operable to transmit an identifier to the RFID reader to provide the instructions to the controller to activate the reset button during the tamper proof mode, the first pad transmitter of the fall detection pad includes a second RFID tag that is operable to transmit a pad identifier for transmitting the pairing communication to the RFID reader of the fall monitor display unit, the second wireless communications receiver of the fall monitor display unit includes a Bluetooth receiver, and the second pad transmitter of the fall detection pad includes a Bluetooth transmitter for communicating with the Bluetooth receiver of the fall monitor display unit when the fall detection pad is paired with the fall monitor display unit to transmit the fall alarm communication when the fall detection pad determines that a patient has removed pressure from the fall detection pad.

8. The fall monitor system of claim 1 wherein the tamper proof mode further includes disabling an adjustment of at least one of a volume of the alarm signal and a melody of the alarm signal.

9. A fall monitor display unit comprising:

a controller configured to generate a fall alarm signal in response to a fall alarm communication from a fall sensor;

a reset button configured to provide instructions to the controller for disabling the fall alarm signal when the reset button is activated and engaged;

a tamper proof mode in which the reset button is deactivated such that engagement of the reset button of the fall monitor display unit is prevented from disabling the fall alarm signal; and a clinician key section having at least a first wireless communications receiver configured to receive a wireless communication from a clinician key, the wireless communication operable to activate the reset button when the fall monitor display unit is in the tamper proof mode and the clinician key is placed in proximity to the clinician key section.

10. The fall monitor display unit of claim 9 wherein the first wireless communications receiver is an RFID reader configured to receive an identifier from an RFID tag of the clinician key activating the reset button when the fall monitor display unit is in the tamper proof mode.

11. The fall monitor display unit of claim 9 further comprising a second wireless communications receiver configured to receive the fall alarm communication from a transmitter of the fall sensor after the fall sensor is paired to the fall monitor display unit.

12. The fall monitor display unit of claim 11 wherein the first wireless communications receiver of the fall monitor display unit includes an RFID receiver and the second wireless communications receiver of the fall monitor display unit includes a Bluetooth receiver.

13. The fall monitor display unit of claim 11 wherein the second wireless communications receiver is configured to receive wireless communications according to a longer range communications protocol than the first wireless communications receiver.

14. The fall monitor display unit of claim 9 wherein the first wireless communications receiver includes a low power state for conserving power while detecting for the presence of the clinician key being placed in proximity to the clinician key section and an increased power state for communicating with the clinician key when the presence of the clinician key is detected.

15. The fall monitor display unit of claim 9 wherein the wireless communication received from the clinician key is operable to activate the reset button for a predetermined period of time.

16. The fall monitor display unit of claim 9 wherein the instructions to the controller for disabling the fall alarm signal includes silencing the fall alarm signal when the fall monitor display unit is in an alarm state and suspending the fall alarm signal when the fall monitor display unit is in a monitoring state.

17. The fall monitor display unit of claim 9 further comprising a standard operating mode wherein the reset button remains activated such the fall alarm signal is operable to be disabled when the reset button is engaged without first requiring the first wireless communications receiver to receive the wireless communication from the clinician key.

18. A method for monitoring a patient for a fall, the method comprising:

providing a fall monitor display unit configured to generate a fall alarm signal in response to a fall alarm communication, the fall monitor display unit including:

a reset button configured to provide instructions to the controller for disabling the fall alarm signal when the reset button is activated and engaged, a tamper proof mode in which the reset button is deactivated such that engagement of the reset button of the fall monitor display unit is prevented from disabling the fall alarm signal, and a clinician key section having at least a first wireless communications receiver configured to receive a wireless communication from a clinician key, providing a fall sensor configured to generate the fall alarm communication;

generating the fall alarm communication when the fall sensor detects a patient fall;

transmitting the fall alarm communication from the fall sensor to the fall monitor display unit;

generating the fall alarm signal at the fall monitor display unit upon receipt of the fall alarm communication from the fall sensor;

activating the reset button when the monitor display unit is in the tamper proof mode upon receipt of the wireless communication by the first wireless communications receiver while the clinician key is placed in proximity to the clinician key section; and disabling the fall alarm signal upon engagement of the reset button while the reset button is activated when the fall monitor display unit is in the tamper proof mode.

19. The method of claim 18 wherein the fall sensor includes a sensor transmitter configured to transmit a pairing communication to the first wireless communications receiver of the clinician key section, the method further comprising pairing the fall sensor to the fall monitor display unit upon receipt of the pairing communication from the sensor transmitter when the fall sensor is placed in proximity to the clinician key section.

20. The method of claim 18 wherein the fall monitor display unit further includes a standard operating mode wherein the reset button remains activated, the method further comprising disabling the fall alarm signal when the fall monitor display unit is in the standard operating mode upon engagement of the reset button without first requiring the first wireless communications receiver to receive the wireless communication from the clinician key.

* * * * *